(12) United States Patent
Hammond

(10) Patent No.: US 9,874,313 B2
(45) Date of Patent: Jan. 23, 2018

(54) BREACH CONTAINMENT DEVICE WITH SAMPLE SAVER

(71) Applicant: Tyson Hammond, Dickinson, ND (US)

(72) Inventor: Tyson Hammond, Dickinson, ND (US)

( * ) Notice: Subject to any disclaimer, the term of this patent is extended or adjusted under 35 U.S.C. 154(b) by 0 days.

(21) Appl. No.: 15/150,256

(22) Filed: May 9, 2016

(65) Prior Publication Data

US 2016/0327211 A1 Nov. 10, 2016

Related U.S. Application Data

(60) Provisional application No. 62/158,206, filed on May 7, 2015.

(51) Int. Cl.
*F17D 5/02* (2006.01)
*G08B 5/36* (2006.01)
*B65D 85/00* (2006.01)

(52) U.S. Cl.
CPC ............ *F17D 5/02* (2013.01); *B65D 85/00* (2013.01); *G08B 5/36* (2013.01); *Y10T 137/5762* (2015.04); *Y10T 137/8342* (2015.04)

(58) Field of Classification Search
CPC .... F17D 5/02; F17D 5/06; G08B 5/36; B65D 85/00; Y10T 137/8342; Y10T 137/5762
USPC .......................................................... 137/312
See application file for complete search history.

(56) References Cited

U.S. PATENT DOCUMENTS

| | | | | |
|---|---|---|---|---|
| 8,851,099 B2 * | 10/2014 | DeGeorge et al. | ..... | B23P 11/00 137/15.11 |
| 2014/0196802 A1 * | 7/2014 | Guy et al. | ............... | E03B 7/071 137/486 |

* cited by examiner

*Primary Examiner* — Kevin Lee
(74) *Attorney, Agent, or Firm* — Michael L. Greenberg, Esq.; Greenberg & Lieberman, LLC

(57) ABSTRACT

A containment device with a sample saving feature is disclosed. The device is equipped to withstand the pressure created by a breached LACT unit, pump conduit, sample selector, high pressure pump, volume regulator, or other similar equipment. The device is equipped with at least one vent disposed at the top of the container. Additionally, the device is equipped with at least one drain disposed at the bottom of the container, configured to drain any breached contents to be saved, minimizing product loss. A center conduit is disposed between the top portion and the bottom portion of the container, providing for the placement of the entirety of the LACT unit or other equipment to be housed within the container. At least one sensor is disposed within the containment device, and is configured to detect the presence of liquid. Upon detection of liquid product within the device, an alarm or other indicator may be activated, calling attention to the breach.

5 Claims, 2 Drawing Sheets

BREACH CONTAINMENT DEVICE WITH SAMPLE SAVER

CONTINUITY

This application is a non-provisional application of provisional patent application No. 62/158,206, filed on May 7, 2015, and priority is claimed thereto.

FIELD OF THE PRESENT INVENTION

The field of the present invention relates to containment devices, and more specifically relates to instruments configured to contain and direct a leak or rupture of a failed seal or intended breach point such that the product can be reclaimed, and spillage is minimized.

BACKGROUND OF THE PRESENT INVENTION

In many industrial settings, the logistical process of petroleum and other oil-based products conventionally conveyed in liquid form requires the use of many pumps and transfer points. Often, the use of these pumps causes parts to wear over time, causing seals and valves to potentially fail. The planned obsolescence of the seals of pumps employed in many of these processes makes the failure of the seal commonplace, and a part of the standardly scheduled maintenance of the project.

A wide variety of containment devices are present on the market today. These containment devices are generally configured to minimize the chance of danger from the rupture or breach of a high pressure seal. While effective at ensuring operators remain safe during a breach, conventional containment devices are not configured to minimize the loss of product during a breach. As such, use of conventional containment devices on high pressure valves and seals predicates the loss of product.

Thus, there is a need for a new containment apparatus configured to extend around the entirety of the seal and/or valve apparatus, such that product can be contained in the likely event of a breach, the safety of the operators can be ensured, and product may be easily reclaimed via an integrated drain.

SUMMARY OF THE PRESENT INVENTION

The present invention is a containment device configured to extend around a pump, LACT unit, regulator, or other liquid transfer system. The present invention is preferably equipped a top portion and a bottom portion. At least one vent is disposed on the top portion providing for the escape of air during a breach event. The bottom portion of the present invention is preferably equipped with at least one drain. The at least one drain is configured to provide a conduit for the product from the breach to be contained and recaptured for use or sampling without further contamination of the product.

The bottom of the bottom portion is preferably angled so as to better channel the breached product toward the at least one drain, preferably disposed at a side of the bottom portion of the present invention. The at least one vent of the present invention is preferably finned, or slit, so as to minimize product loss, while ensuring that the containment device of the present invention does not rupture under the pressure of a breach. It should be understood that, in the event of a breach, the container of the present invention will rapidly fill with product, displacing the air. The at least one vent provides an easy conduit through which air may escape during the breach.

BRIEF DESCRIPTION OF THE DRAWINGS

The present invention will be better understood with reference to the appended drawing sheets, wherein.

DETAILED DESCRIPTION OF THE PREFERRED EMBODIMENT

The present invention generally comprises a container (10) configured and sized to extend around the entirety of a device prone or designed to breach, such as a LACT unit, sample selector, high pressure pump, volume regulator, or other similar equipment. The container is preferably equipped with a top portion (20) and a bottom portion (30). The bottom portion (30), as seen in FIG. 3, is equipped with at least one drain outlet (40). The at least one drain outlet (40) is configured to collect and drain any spilled product when a breach occurs.

Figure 1:
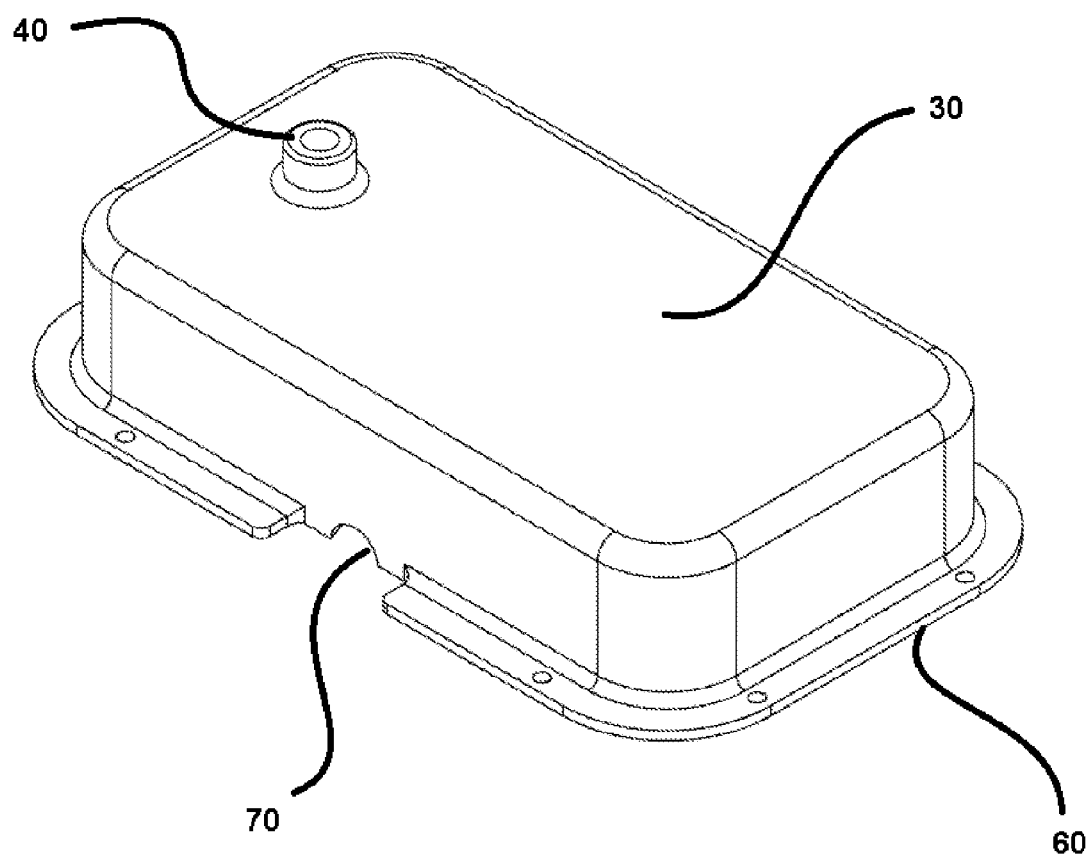
FIG. 1 displays a view of the preferred embodiment of the present invention, exhibiting the bottom portion.
Figure 2:
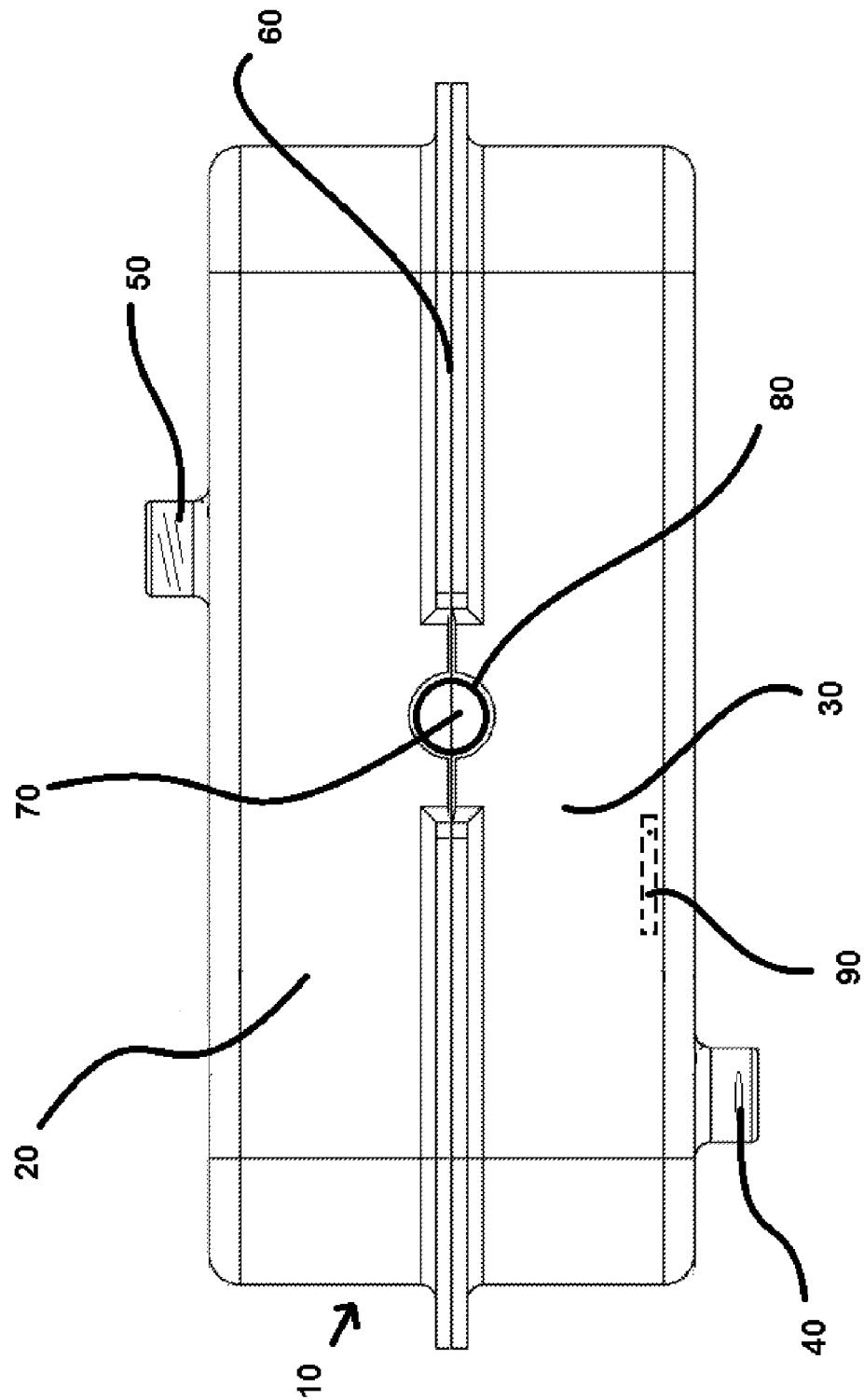
FIG. 2 shows a view of the present invention as seen from the side, showing both the top portion and bottom portion of the device together.

The top portion of the present invention is preferably equipped with at least one vent (50) configured to permit air to escape the container (10) in the event of an equipment malfunction or standard breach. A seam (60) may be present at the line between the top portion (20) and bottom portion (30) of the container (10) as seen in FIG. 1. On the seam (60), a conduit (70) is disposed for the passing of the mainline to the LACT unit within a sampling system. The conduit (70) preferably attaches to a ⅛ inch pipe disposed through a hole in the top of the container (10). It should be understood that the container (10) device of present invention functions as an enclosure for a volume regulator or sample ejector of a pump system. A ¼ inch grommet (80) is preferably disposed within the conduit (70), however it is envisioned that other sized grommets may be used. The grommet (80) is configured to form a liquid-tight seal around the mainline of the regulator disposed within the container (10) of the present invention. The grommet (80) is configured to extend around the intake line of the LACT assembly or other regulator.

Alternate embodiments of the present invention may include variations on the size of the container (10), as well as the size and placement of the grommet (80), at least one vent (50) and conduit (70). It is envisioned that the preferred embodiment of the present invention employs an angled slope disposed on the bottom of the bottom portion (30) of the present invention, so as to expedite drainage of the product toward the drain during and after a breach.

At least one sensor (90) is preferably disposed within the container (10) of the containment device of the present invention. The at least one sensor (90) is configured to detect the presence of product within the container. The at least one sensor (90) is preferably a class 1 sensor that is intrinsically safe for use in a hazardous environment. Upon the detection of product, an alarm is sounded and/or an indicator light is illuminated, signaling that a breach may be underway or immanent. The alarm is preferably wired into a Programmable Logic Controller (PLC) as a permissive input to shut down the unit if the switch is opened, effectively shutting down the unit locally. The indicator light is preferably disposed at a control panel of the unit, from which the unit may be shut down quickly.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A containment apparatus for reclaiming liquid product from a breach comprising:
    a container;
    wherein said container has a top portion and a bottom portion;
    a seam, said seam disposed horizontally between said top portion and said bottom portion;
    wherein said seam circumscribes a center of said container;
    at least one drain outlet, said at least one drain outlet disposed on a bottom of said bottom portion;
    at least one vent that is finned, said at least one vent disposed on said container;
    a conduit, said conduit disposed on said seam;
    a grommet, said grommet in communication with said conduit;
    wherein said vent is disposed facing upward on said container at a location not directly above said conduit;
    at least one sensor, said at least one sensor configured to detect the liquid; and
    wherein said at least one sensor is disposed within said container.

2. The apparatus of claim 1, wherein said container is configured to enclose a volume regulator.

3. The apparatus of claim 1, wherein said container is configured to enclose a sample ejector of a pump system.

4. The apparatus of claim 1, further comprising an alarm; and
    wherein said alarm activates when the liquid is detected via said at least one sensor.

5. The apparatus of claim 1, further comprising an indicator light; and
    wherein said indicator light illuminates when the liquid is detected via said at least one sensor.

* * * * *